United States Patent
Jiang et al.

(10) Patent No.: US 11,907,851 B2
(45) Date of Patent: Feb. 20, 2024

(54) IMAGE DESCRIPTION GENERATION METHOD, MODEL TRAINING METHOD, DEVICE AND STORAGE MEDIUM

(71) Applicant: Tencent Technology (Shenzhen) Company Limited, Shenzhen (CN)

(72) Inventors: Wenhao Jiang, Shenzhen (CN); Lin Ma, Shenzhen (CN); Wei Liu, Shenzhen (CN)

(73) Assignee: TENCENT TECHNOLOGY (SHENZHEN) COMPANY LIMITED, Guangdong Province (CN)

( * ) Notice: Subject to any disclaimer, the term of this patent is extended or adjusted under 35 U.S.C. 154(b) by 77 days.

(21) Appl. No.: 17/589,726

(22) Filed: Jan. 31, 2022

(65) Prior Publication Data

US 2022/0156518 A1    May 19, 2022

Related U.S. Application Data

(63) Continuation of application No. 16/548,621, filed on Aug. 22, 2019, now Pat. No. 11,270,160, which is a
(Continued)

(30) Foreign Application Priority Data

Aug. 30, 2017    (CN) .......................... 201710763735.3

(51) Int. Cl.
*G06N 3/084* (2023.01)
*G06N 3/049* (2023.01)
(Continued)

(52) U.S. Cl.
CPC ........... *G06N 3/084* (2013.01); *G06F 18/214* (2023.01); *G06F 18/217* (2023.01); *G06N 3/044* (2023.01);
(Continued)

(58) Field of Classification Search
CPC ... G06F 16/583; G06N 3/0454; G06N 3/0445
See application file for complete search history.

(56) References Cited

U.S. PATENT DOCUMENTS 9,311,342 B1 *   4/2016  Engström ............... G06F 16/51
2007/0245400 A1  10/2007  Paek et al.
(Continued)

FOREIGN PATENT DOCUMENTS

CN    105631468 A    6/2016
CN    105701502 A    6/2016
(Continued)

OTHER PUBLICATIONS

Dong-Jin Kim, et al., "Sentence Learning on Deep Convolutional Networks for Image Caption Generation," 2016 13th International Conference on Ubiquitous Robots and Ambient Intelligence, Aug. 19-22, 2016, 3 pgs.
(Continued)

*Primary Examiner* — Ross Varndell
(74) *Attorney, Agent, or Firm* — Morgan, Lewis & Bockius LLP

(57) ABSTRACT

Embodiments of this application disclose an image description generation method performed at a computing device. The method includes: obtaining a target image; generating a first global feature vector and a first label vector set of the target image; generating a first multi-mode feature vector of the target image through a matching model, the matching model being a model obtained through training according to a training image and reference image description information of the training image; and applying the first multi-mode feature vector, the first global feature vector, and the first label vector set to a computing model, to obtain the target image description information, the computing model being a model obtained through training according to image
(Continued)

description information of the training image and the reference image description information.

17 Claims, 7 Drawing Sheets

Related U.S. Application Data continuation of application No. PCT/CN2018/102469, filed on Aug. 27, 2018.

(51) Int. Cl.
- G06F 18/214 (2023.01)
- G06F 18/21 (2023.01)
- G06N 3/044 (2023.01)
- G06N 3/045 (2023.01)
- G06V 10/776 (2022.01)
- G06V 10/82 (2022.01)
- G06V 10/44 (2022.01)

(52) U.S. Cl.
CPC ............ *G06N 3/045* (2023.01); *G06N 3/049* (2013.01); *G06V 10/454* (2022.01); *G06V 10/776* (2022.01); *G06V 10/82* (2022.01)

(56) References Cited

U.S. PATENT DOCUMENTS

| | | | |
|---|---|---|---|
| 2017/0061250 A1* | 3/2017 | Gao | ............... G06N 3/0454 |
| 2017/0098153 A1 | 4/2017 | Mao et al. | |
| 2017/0200065 A1 | 7/2017 | Wang et al. | |

FOREIGN PATENT DOCUMENTS

| | | | |
|---|---|---|---|
| CN | 105760507 A | * | 7/2016 |
| CN | 105760507 A | | 7/2016 |
| CN | 105893573 A | | 8/2016 |
| CN | 106326288 A | | 1/2017 |
| CN | 106446782 A | | 2/2017 |
| CN | 106650789 A | | 5/2017 |
| CN | 106777125 A | | 5/2017 |
| CN | 106846306 A | | 6/2017 |
| CN | 107066973 A | | 8/2017 |
| CN | 108305296 A | | 7/2018 |

OTHER PUBLICATIONS

Julian Hitschler et al., "Multimodal Pivots for Image Caption Translation," Jun. 13, 2016, 11 pgs.

Tencent Technology, ISRWO, PCT/CN2018/102469, dated Nov. 30, 2018, 6 pgs.

Tencent Technology, IPRP, PCT/CN2018/102469, dated Mar. 3, 2020, 5 pgs.

* cited by examiner

IMAGE DESCRIPTION GENERATION METHOD, MODEL TRAINING METHOD, DEVICE AND STORAGE MEDIUM

CROSS-REFERENCE TO RELATED APPLICATIONS

This application is a continuation application of U.S. application Ser. No. 16/548,621, entitled "Image description generation method, model training method, device, and storage medium" filed on Aug. 22, 2019, which is a continuation application of PCT/CN2018/102469, entitled "Image description generation method, model training method, device, and storage medium" filed on Aug. 27, 2018, which claims priority to Chinese Patent Application No. 201710763735.3, entitled "Image description generation method, model training Method, device, and storage medium" filed with the China National Intellectual Property Administration on Aug. 30, 2017, all of which are incorporated herein by reference in their entirety.

FIELD OF THE TECHNOLOGY

Embodiments of this application relate to the technical field of machine learning, and in particular, to an image description generation method, a model training method, a device, and a storage medium.

BACKGROUND OF THE DISCLOSURE

With development of image recognition technology, content information of an image may be converted into text description of the image through machine-readable instructions.

SUMMARY

Embodiments of this application provide an image description generation method, a model training method, a terminal, and a storage medium.

According to a first aspect of the present application, an embodiment of this application provides an image description generation method, applied to a computing device, including:

obtaining a target image;
generating a first global feature vector and a first label vector set of the target image;
generating a first multi-mode feature vector of the target image through the matching model, wherein the matching model is a model obtained through training according to a training image and reference image description information of the training image; and
applying the first multi-mode feature vector, the first global feature vector, and the first label vector set to a computing model, to obtain the target image description information, wherein the computing model is a model obtained through training according to image description information of the training image and the reference image description information.

According to a second aspect of the present application, an embodiment of this application provides a computing device, including one or more processors, memory coupled to the one or more processors and a plurality of programs stored in the memory that, when executed by the one or more processors, cause the computing device to perform the image description generation method as described above.

According to a third aspect of the present application, an embodiment of this application provides a non-transitory computer readable storage medium storing a plurality of machine readable instructions in connection with a computing device having one or more processors, wherein the plurality of machine readable instructions, when executed by the one or more processors, cause the computing device to perform the image description generation method as described above.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

Figure 1:
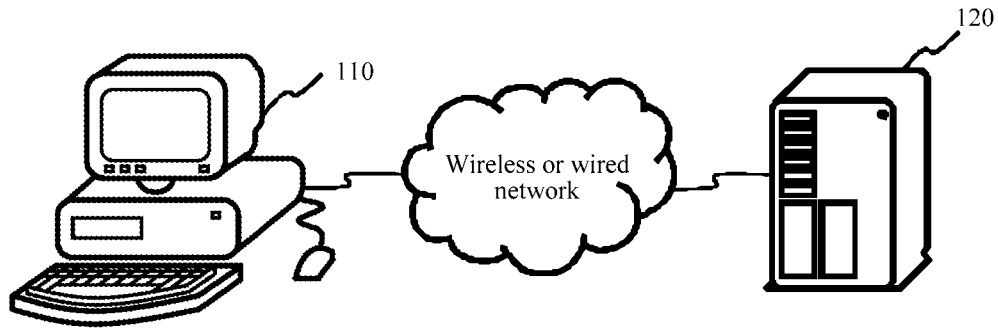
FIG. 1 is a schematic diagram of an implementation environment involved by an image description generation method and a model training method according to each embodiment of this application.

To make objectives, technical solutions, and advantages of this application clearer, the following further describes in detail embodiments of this application with reference to the accompanying drawings.

To facilitate description, terms involved in each embodiment of this application are introduced briefly.

Convolution Neural Network (CNN) is a feedforward neural network that extracts features of an image layer by layer directly from pixel features at a bottom layer of the image, and it is a most commonly used implementation model of an encoder and responsible for encoding the image into vectors.

Recurrent Neural Network (RNN) is a neural network having a fixed weight value, an external input, and an internal state, and may be regarded as behavioral dynamics taking the weight value and the external output as parameters and relating to the internal state. RNN is a most commonly used implementation model of an encoder and is responsible for translating image vectors generated by the encoder into text description of the image.

Long-Short-Term Memory (LSTM) is a time recurrent neural network, is used to process and predict an important event in a time sequence, of which an interval or delay is relatively long, and is a special RNN.

Attention Mechanism is usually used in RNN. Each time when some pixels of a target image are processed, RNN having Attention Mechanism processes the pixels according to some pixels of a target image concerned by a previous state of a current state, rather than according to all pixels of the target image, to reduce processing complexity of a task.

Stochastic Gradient Descent (SGD) is a method for minimizing a target function, each time when one new sample or a batch of new samples are iterated, the SGD only considers that a loss of a current sample point tends to be minimum and considers no other sample points, and furthermore, each time when one new sample or a batch of new samples are iterated, all parameters in the target function will be updated once.

Cross-Entropy Cost Function is a method for calculating an error between a predictive distribution of a neural network and an actual distribution, and during a process of training a neural network by using back-propagation, if the error between the predictive distribution and the actual distribution is greater, an adjustment range of various parameters of the neural network is larger.

In a related technology, an image description generation method may include: encoding, by an encoder, such as a feature extraction module, a target image obtained, generating a global feature vector and a label vector set of the target image, applying the global feature vector and the label vector set of the target image to a decoder, such as a computing model, and finally, obtaining description information of the target image.

In the image description generation method provided by the related technology, input parameters of the decoder only include the global feature vector and the label vector set of the target image, that is, the input parameters of the decoder only include image information of the target image, easily resulting in that generated image description information is not accurate enough.

In view of this, embodiments of this application provide an image description generation method, a model training method, a terminal, and a storage medium, to enhance accuracy of generated image description information. Specific technical solutions will be described below in detail.

Referring to FIG. 1, FIG. 1 is a schematic diagram of an implementation environment involved by an image description generation method and a model training method according to each embodiment of this application. As shown in FIG. 1, the implementation environment includes a training device 110 and a generation device 120.

The training device 110 is a device configured to train a description generation model. The description generation model is configured to generate, according to a training image and corresponding reference image description information, description information of the training image. During actual implementation, the training device 110 may be a computing device capable of carrying out complicated algorithms, such as a computer terminal, a mobile phone terminal, and a server.

In some embodiments of this application, the description generation model includes a feature extraction model, a matching model, and a computing model. The feature extraction model is configured to generate, according to the training image, a global feature vector and a label vector set of the training image, and generate a corresponding text feature vector according to the reference image description information of the training image. The matching model is configured to generate a multi-mode feature vector of the training image according to the global feature vector and the text feature vector obtained through the feature extraction model. The computing model is configured to generate description information of the training image according to the multi-mode feature vector generated by the matching model and the global feature vector and the label vector set generated by the feature extraction model, to generate description information of the training image. During actual implementation, the training device 110 trains the computing model in the description generation model continuously according to the generated description information and the reference image description information of the training image.

The generation device 120 is a device configured to generate description information of the target image according to the description generation model. During actual implementation, the generation device 120 may be a computing device capable of carrying out complicated algorithms, such as a computer terminal, a mobile phone terminal, and a server.

In some embodiments of this application, the training device 110 and the generation device 120 may be the same device or may also be different devices. If the training device 110 and the generation device 120 are the same device, the description generation model in the generation device 120 is a model that is trained and stored by itself in advance. If the training device 110 and the generation device 120 are different devices, the description generation model in the generation device 120 may be a model obtained from the training device 110 and obtained through the training of the training device 110.

Figure 2:
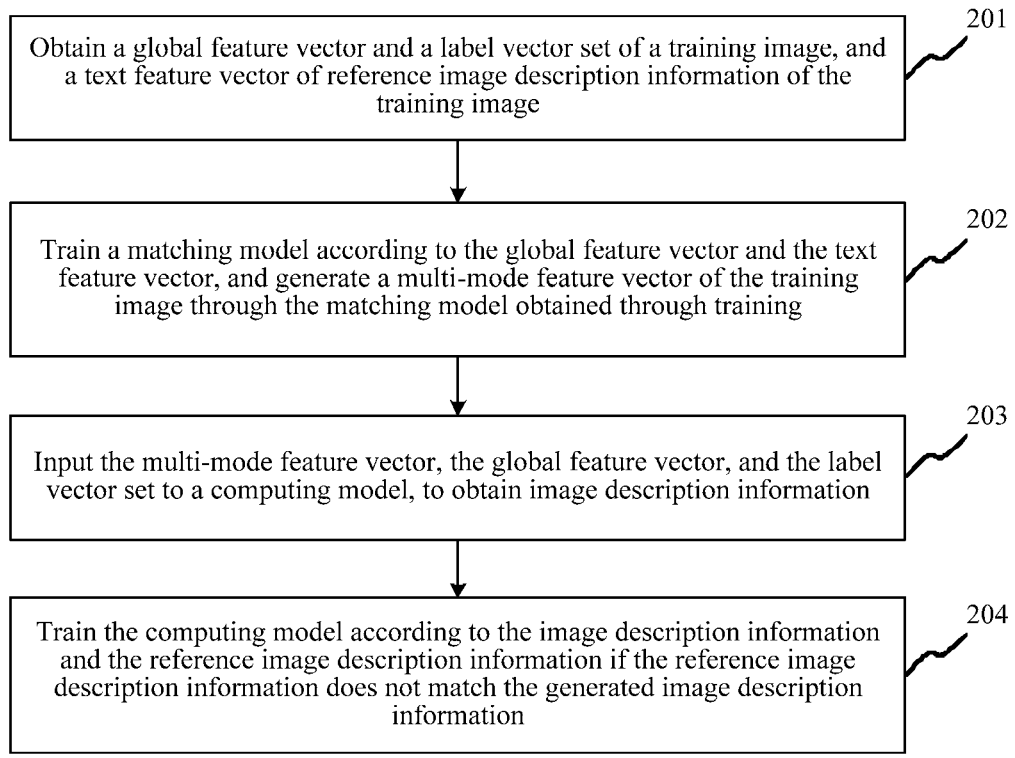
FIG. 2 is a flowchart of a model training method according to an embodiment of this application.

FIG. 2 is a flowchart of a model training method according to an embodiment of this application. For example, in this embodiment, the model training method is used in the training device shown in FIG. 1. As shown in FIG. 2, the model training method may include the following steps:

Step 201: Obtain a global feature vector and a label vector set of a training image, and a text feature vector of reference image description information of the training image.

The training image is a preset image for training, the global feature vector is a vector having a preset length and describing whole features of the training image, the label vector set is a set of vectors of a plurality of sub-region features describing the training image, and the reference image description information of the training image is preset text information for describing the corresponding training image. The training image may include at least one image, and during actual implementation, to increase training samples to further enhance training accuracy, a plurality of training images may be included, reference image description information of each training image may include 3 to 5 statements and each statement is a statement capable of describing a complete content of the training image independently.

In some embodiments of this application, a global feature vector and a label vector set of a training image and a text feature vector of reference image description information of the training image may be obtained through a feature extraction model. The feature extraction model includes two parts. The step of obtaining a global feature vector and a label vector set includes: encoding the training image through a first part of the feature extraction model and generating the global feature vector and the label vector set of the training image. The step of obtaining a text feature vector includes: encoding the reference image description information of the training image through a second part of the feature extraction model, to generate a corresponding text feature vector. In some embodiments of this application, the first part of the feature extraction model may be a pre-trained CNN, the CNN includes a plurality of convolution layers and a plurality of full connection layers, the global feature vector may be generated through a last full connection layer of the CNN and the label vector set may be generated through a fourth convolution layer of the CNN, and for example, the first part is a Visual Geometry Group (VGG) network. The full connection layer is a network connected to each neuron of an output layer and each neuron of an input layer. In some embodiments of this application, the second part of the feature extraction model may encode the reference image description formation of the training image through a Fisher Vector technology.

During actual implementation, the global feature vector and the label vector set may be generated through the first part first, and then, the text feature vector may be generated through the second part, or the text feature vector may be generated through the second part first, and then, the global feature vector and the label vector set may be generated through the first part, or the text feature vector may be generated through the second part while the global feature vector and the label vector set are generated through the first part.

Step 202: Train a matching model according to the global feature vector and the text feature vector, and generate a multi-mode feature vector of the training image through the matching model obtained through training.

The matching model includes two parts. The first part is used to convert the global feature vector to a global feature matching vector and the second part is used to convert the text feature vector to a text feature matching vector. In some embodiments of this application, the first part of the matching model may be a first neural network, the second part of the matching model may be a second neural network, and the first neural network and/or the second neural network may be a full connection multi-layer neural network.

Unless described specially, an example that the first part of the matching model is a first neural network and the second part is a second neural network is taken for description below.

Global feature matching vectors of all training images and all text feature matching vectors corresponding to each training image are mapped to a hidden space of the first neural space, a matching degree between each global feature matching vector and each text feature matching vector is calculated in the hidden space, that is, a similar degree between each global feature matching vector and each text feature matching vector is compared, and a positional relation between each global feature matching vector and each text feature matching vector is adjusted according to the matching degree, that is, the matching model is trained, so that a global feature matching vector and text feature matching vectors for describing the same training image are close in distance, a global feature matching vector and text feature matching vectors for describing different training images are far away from each other in distance, and text feature matching vectors for describing the same training image are close in distance. In some embodiments of this application, during adjustment, a target loss function of the global feature matching vectors and the text feature matching vectors in distribution may be obtained by using a Rank-Loss method, and the target loss function is processed through SGD. The condition for determining whether the matching model has been trained includes: detecting whether a value of the target loss function during a training process is changed, and if the value of the target loss function is unchanged, the matching model has been trained.

After the matching model has been trained, the training image is input to the first neural network again, to obtain multi-mode feature vectors of the training images.

Step 203: Input the multi-mode feature vector, the global feature vector, and the label vector set to a computing model, to obtain image description information of the training image.

During actual implementation, the computing model includes n depth networks, n is a positive integer, and step 203 includes generating image description information according to the multi-mode feature vectors, the global feature vectors, the label vector set, and the n depth networks. An input parameter of at least one depth network in the n depth networks includes a spliced vector, when an input parameter of the $i^{th}$ depth network includes the spliced vector, if i=1, the spliced vector is a vector obtained by splicing the multi-mode feature vector and the label vector set, if i>1, the spliced vector is a vector obtained by splicing an output vector of the $(i-1)^{th}$ depth network and the multi-mode feature vector, $1 \leq i \leq n$, that is, i is greater than or equal to 1, and less than or equal to n. For example, if the computing model only includes a depth network, an input parameter of the depth network includes a spliced vector, and the spliced vector is a vector obtained by splicing a multi-mode feature vector and a label vector set. Furthermore, if the computing model includes three depth networks, an input parameter of the third depth network includes a spliced vector, and the spliced vector is a vector obtained through splicing an output vector and a multi-mode feature vector of a second depth network. In some embodiments of this application, the n depth networks may be an LSTM having an attention mechanism, a Gated Recurrent Unit (GRU), or other RNN.

To describe conveniently, for example, the n depth networks are LSTMs having an attention mechanism and n=2, and the step of generating the image description information according to the multi-mode feature vector, the global feature vector, the label vector set, and the n depth networks specifically includes:

First, splice the multi-mode feature vector M and the label vector set A, to obtain a first spliced vector A'.

Splicing the multi-mode feature vector M and the label vector set A is only formal splicing, for example, if a length of the multi-mode feature vector M is n1 and a length of the label vector set A is n2, a length of the first spliced vector A' is n1+n2. During actual implementation, in a splicing process, the label vector set A is placed above and the multi-mode feature vector M is placed below.

Second, input the first spliced vector A' and the global feature vector to a first depth network, to obtain a first output vector h(t).

When the depth network is an LSTM having an attention mechanism, the first depth network may be expressed as a function having an internal state: h(t)=LSTM(0, h(t−1), A'). h(t) is a hidden state of the LSTM after a current time step t, that is, an output value of an activation function of an intermediate hidden memory unit of the LSTM, and h(t−1) is a hidden state of the LSTM after a previous time step t−1.

Third, splice the first output vector h(t) and the multi-mode feature vector M, to obtain a second spliced vector A".

Like the method in the first step, splicing the first output vector h(t) and the multi-mode feature vector M is only formal splicing of addition, and will not be described repeatedly herein. During actual implementation, in the two splicing processes, the position of the multi-mode feature vector M is unchanged, for example, the multi-mode feature vector M is located below in the two splicing processes.

Fourth, input the second spliced vector A" to a second depth network, to obtain image description information.

When the depth network is an LSTM having an attention mechanism, the second depth network may also be expressed as a function having an internal state, but differently, h(t)=LSTM(x(t), h(t−1), A"). In each time step t, an input of the second depth network includes an embedding vector x(t) of a $t^{th}$ character in reference image description information.

For h(t) output in each time step t, a linear regression method is used to predict a next character to be generated in the image description information, to obtain a corresponding Chinese character and finally obtain the image description information. The image description information is a statement of a complete content capable of describing the training image independently. In some embodiments of this application, the linear regression method may be a Softmax regression method.

Step 204: Train the computing model according to the image description information and the reference image description information if the reference image description information does not match the generated image description information.

Determining whether the generated image description information matches the reference image description information of the training image is calculating an error there-between. During actual implementation, a Cross-Entropy Cost Function is used as a loss function to calculate an error of a predicted distribution of characters and a real distribution of characters, various parameters in the computing model are adjusted continuously through the SGD, the computing model is optimized, that is, the computing model is trained, till a value of the loss function is no longer changed, that is, an error value there-between cannot be reduced any longer.

In view of the above, for the model training method in this embodiment, the matching model is trained according to the training image and the reference image description information corresponding to the training image, so that the multi-mode feature vector generated by the trained matching model includes predicted text information; the multi-mode feature vector including the predicted text information is input to the computing model, so that the description information of the training image generated by the computing model is more accurate; and finally, the computing model is trained according to the relatively accurate description information and the reference image description information, to achieve effects of enhancing accuracy of the image description information generated by a description generation model.

Figure 3:
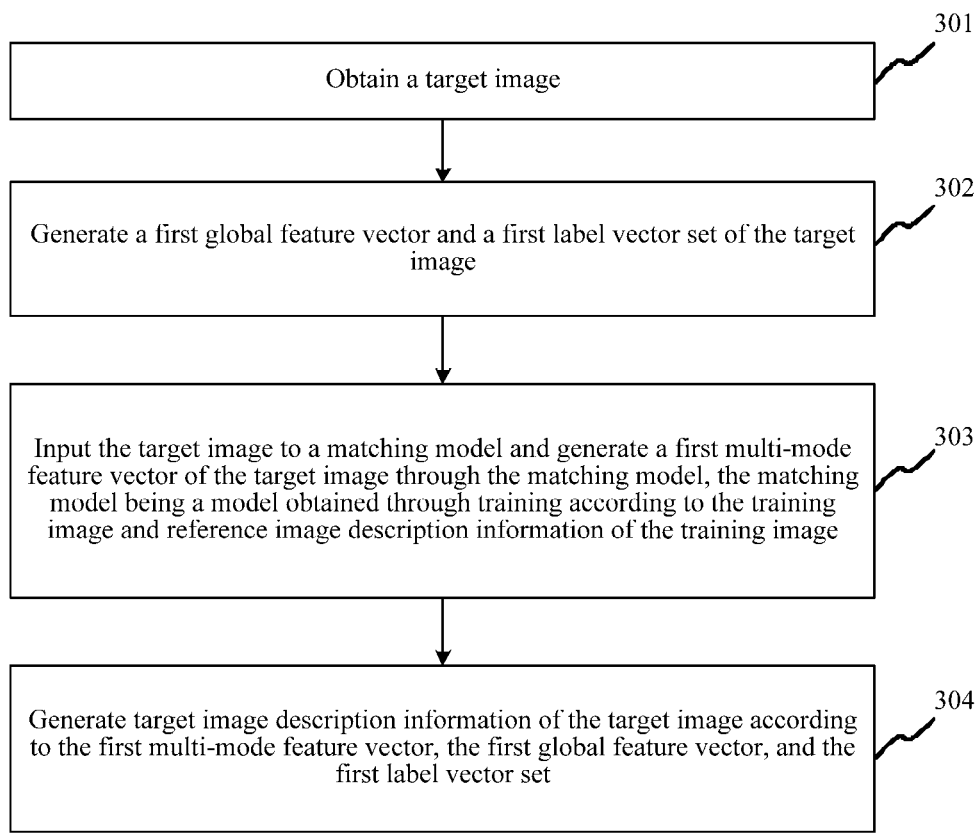
FIG. 3 is a flowchart of an image description generation method according to an embodiment of this application.

Referring to FIG. 3, FIG. 3 is a flowchart of an image description generation method according to an embodiment of this application. In this embodiment, the image description generation method is used in the generation device shown in FIG. 1. As shown in FIG. 3, the image description generation method may include the following steps:

After a training device has trained a description generation model, a generation device obtains the description generation model. In some embodiments of this application, the step that the generation device obtains the description generation model may include: sending, by the generation device, an obtaining request to the training device, receiving the description generation model returned by the training device, or receiving, by the generation device, the description generation model sent by the training device actively.

Step 301: Obtain a target image.

In some embodiments of this application, a pre-stored target image may be read. The target image may be an image captured and stored by the generation device, an image obtained from another device and stored in advance, or an image downloaded from a network and stored in advance. Certainly, during actual implementation, the generation device may further send an image obtaining request to another device and receive a target image returned by the another device, or receive a target image that is actively sent by another device.

During actual implementation, the target image is usually an image that is different from a training image.

Step 302: Generate a first global feature vector and a first label vector set of the target image.

The target image is input to a feature extraction model. During a process of generating image description, the target image is encoded through a first part of the feature extraction model, to generate the first global feature vector and the first label vector set of the target image.

Step 303: Input the target image to a matching model and generate a first multi-mode feature vector of the target image through the matching model, the matching model being a model obtained through training according to the training image and reference image description information of the training image.

During actual implementation, the target image is encoded through a first part of the trained matching model, to generate the first multi-mode feature vector of the target image. Since the matching model in this embodiment is the trained matching model in the foregoing embodiment, the generated multi-mode feature vector includes predicted text information.

Step 304: Generate target image description information of the target image according to the first multi-mode feature vector, the first global feature vector, and the first label vector set.

During actual implementation, the first multi-mode feature vector, the first global feature vector, and the first label vector set are input into a computing model, to obtain the target image description information. The computing model in this embodiment is the computing model that is obtained through training according to the image description information and the reference image description information of the training image in the foregoing embodiment.

In some embodiments of this application, the computing model includes n depth networks, n is a positive integer, and the step includes generating the image description information according to the multi-mode feature vector, the global feature vector, the label vector set, and the n depth networks. An input parameter of at least one depth network in the n depth networks includes a spliced vector, when an input parameter of the $i^{th}$ depth network includes the spliced vector, if i=1, the spliced vector is a vector obtained by splicing the multi-mode feature vector and the label vector set, if i>1, the spliced vector is a vector obtained by splicing an output vector of the $(i-1)^{th}$ depth network and the multi-mode feature vector, 1≤i≤n. In some embodiments of this application, the n depth networks may be LSTMs having an attention mechanism and may also be other RNNs.

To describe conveniently, for example, the n depth networks are LSTMs having an attention mechanism and n=2, and the step of generating the image description information according to the first multi-mode feature vector, the global feature vector, the label vector set, and the n depth networks specifically includes:

First, splice the first multi-mode feature vector M and the first label vector set A, to obtain a first spliced vector A'.

Second, input the first spliced vector A' and the first global feature vector to a first depth network, to obtain a first output vector h(t).

Third, splice the first output vector h(t) and the first multi-mode feature vector M, to obtain a second spliced vector A".

Fourth, input the second spliced vector A" to a second depth network, to obtain target image description information.

When the depth network is an LSTM having an attention mechanism, the second depth network may also be expressed as a function having an internal state: h(t)=LSTM (x(t), h(t−1), A"). However, a difference lies in that, in each time step t, a distribution of a next Chinese character to be generated in the target image description information is computed according to the output h(t) of the second depth network, the next Chinese character to be generated is determined according to a greedy search algorithm or a beam search algorithm, and used as an input vector x(t) of the function h(t) in a next time step t+1, and after continuous recursive cloud computation, complete target image description information is finally obtained.

A specific implementation process of step 304 is similar to step 203 in the foregoing embodiment, and will not be described repeatedly herein.

Figure 4:
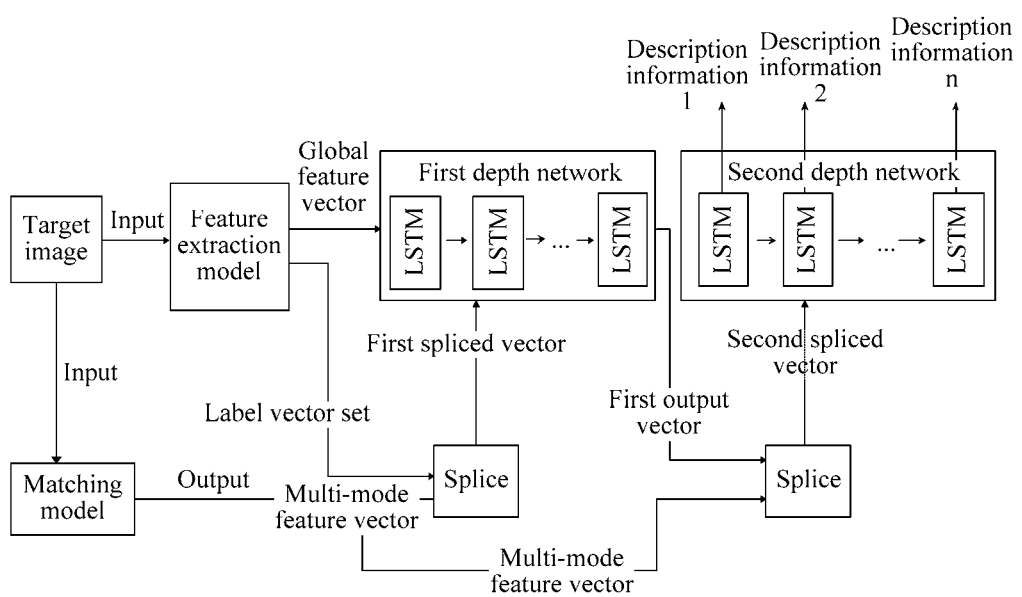
FIG. 4 is a flowchart of an image description generation method according to an embodiment of this application.

The image description generation method according to the foregoing embodiment is usually used in a device that has an image search function. After the description generation model has been trained, the device may capture a large amount of target images, generates corresponding target image description information for each target image through the trained description generation model, and store the target image and the target image description information in a database of the device in a one-to-one correspondence manner. When a user needs to search for a certain image or some certain images, the user only needs to input image description information of the image to be searched for, and the input image description information may be at least one key word for describing an image content or may be complete text description. The device may search, according to the image description information input by the user, the database to determine whether related target image description information exists, to find the corresponding target image, and provide the target image found to the user. In some embodiments of this application, the computing model usually includes two LSTM networks based on an attention mechanism, and as shown in FIG. 4, for example, the target image is an image 1, and the specific steps of the image description generation method are described below.

First, obtain a target image. The image 1 is an image captured by the device in daily life. An image content of the image 1 is "a group of people are sitting at the table and taking a photo".

Second, input the target image to the feature extraction model, and encode the target image through the first part of the feature extraction model, to obtain a global feature vector and a label vector set of the target image.

Third, input the target image to the matching model that has been trained, and encode the target image through the first part of the matching model, to obtain a multi-mode feature vector of the target image. The matching model is a model obtained through training according to a training image and reference image description information of the training image.

Fourth, splice the multi-mode feature vector output by the matching model and the label vector set output by the feature extraction model, to obtain a first spliced vector, and input the first spliced vector and the global feature vector to the first depth network, to obtain a first output vector.

Fifth, splice the multi-mode feature vector and the first output vector, to obtain a second spliced vector, and output the second spliced vector to the second depth network. In each time step t, a distribution of a next Chinese character to be generated in the target image description information is computed according to an output vector h(t), the next Chinese character to be generated is determined according to the greedy search algorithm or the beam search algorithm, and used as an input vector x(t) of a function h(t) in a next time step t+1. For example, in a first time step, a distribution of a first Chinese character generated is computed according to an output vector h(1), and the first Chinese character generated is determined to be "一" according to an algorithm, and the Chinese character "一" is used as an input vector x(2) of a function h(2) in a second time step. Similarly, a distribution of a second Chinese character generated is computed according to the output vector h(2), the second Chinese character generated is determined to be "群" according to the algorithm, and the Chinese character "群" is used as an input vector x(3) of a function h(3) in a third time step. The rest can be done in the same manner, and after continuous recursive computation, complete target image description information finally obtained is "一群人围坐在餐桌前扪 合照".

In view of the above, for the image description generation method according to this embodiment, the target image is output to the matching model, to obtain the multi-mode feature vector of the target image, and since the matching model is a model obtained through training according to the training image and the reference image description information of the training image, the multi-mode feature vector generated by the matching model includes predicted text information; and then, the multi-mode feature vector including the predicted text information is input to the computing model, to obtain the target image description information of the target image, so that the generated target image description information is more accurate, and an effect of enhancing accuracy of the generated image description information is achieved.

First, it should be noted that, in this embodiment, a sequence of performing steps 302 and 303 is not limited as long as steps 302 and 303 are performed before step 304. During actual implementation, step 303 may be performed first, and then, step 302 is performed, and furthermore, steps 303 may be performed while step 302 is performed.

Second, it should be noted that, if the description generation model in each foregoing embodiment is applied to an English occasion, the target image description information generated by the description generation model is English description information, and when a user needs to search for a certain image or some certain images, image description information of the image that is input to the device and needs to be searched for is also key words or text description in English. Therefore, the process of generating the target image description information is slightly changed. For example, the target image is still the image 1 and the computing model is two LSTM networks having an attention mechanism, and the specific steps are as follows:

First, obtain a target image. The image 1 is an image captured by the device in daily life. An image content of the image 1 is "a group of people are sitting at the table and taking a photo".

Second, input the target image to the feature extraction model, and encode the target image through the first part of the feature extraction model, to obtain a global feature vector and a label vector set of the target image.

Third, input the target image to the matching model that has been trained, and encode the target image through the first part of the matching model, to obtain a multi-mode feature vector of the target image. The matching model is a model obtained through training according to a training image and reference image description information of the training image.

Fourth, splice the multi-mode feature vector output by the matching model and the label vector set output by the feature extraction model, to obtain a first spliced vector, and input the first spliced vector and the global feature vector to the first depth network, to obtain a first output vector.

Fifth, splice the multi-mode feature vector and the first output vector, to obtain a second spliced vector, and output the second spliced vector to the second depth network. In each time step t, a distribution of a next English word to be generated in the target image description information is computed according to an output vector h(t), the next English word to be generated is determined according to the greedy search algorithm or the beam search algorithm, and used as an input vector x(t) of a function h(t) in a next time step t+1. For example, in a first time step, a distribution of a first English word generated is computed according to an output vector h(1), and the first English word generated is determined to be "a" according to an algorithm, and the word "a" is used as an input vector x(2) of a function h(2) in a second time step. Similarly, a distribution of a second English word generated is computed according to the output vector h(2), the second English word generated is determined to be "group" according to the algorithm, and the word "group" is used as an input vector x(3) of a function h(3) in a third time step. The rest can be done in the same manner, and after continuous recursive computation, complete target image description information finally obtained is "a group of people are sitting at the table and taking a photo".

Figure 5A:
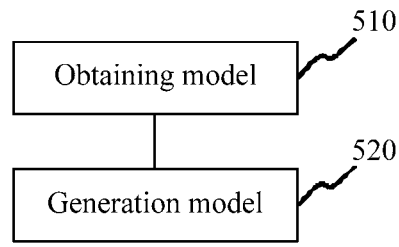
FIG. 5A is a schematic structural diagram of an image description generation apparatus according to an embodiment of this application.

FIG. 5A is a schematic structural diagram of an image description generation apparatus according to an embodiment of this application. As shown in FIG. 5A, the image description generation apparatus may include an obtaining module 510 and a generation module 520.

The obtaining module 510 is configured to obtain a target text.

The generation module 520 is configured to generate a first global feature vector and a first label vector set of the target image.

The generation module 520 is further configured to input the target image obtained by the obtaining module 510 to a matching model and generate a first multi-mode feature vector of the target image through the matching model, the matching model being a model obtained through training according to a training image and reference image description information of the training image.

The generation module 520 is further configured to generate target image description information of the target image according to the first multi-mode feature vector, the first global feature vector, and the first label vector set.

In view of the above, for the image description generation apparatus according to this embodiment, the target image is output to the matching model, to obtain the multi-mode feature vector of the target image, and since the matching model is a model obtained through training according to the training image and the reference image description information of the training image, the multi-mode feature vector generated by the matching model includes predicted text information; and then, the multi-mode feature vector including the predicted text information is input to the computing model, so that the target image description information of the target image generated by the computing model is more accurate, and an effect of enhancing accuracy of the generated image description information is achieved.

Based on the image description generation apparatus according to the foregoing embodiment, in some embodiments of this application, The generation module 520 is further configured to input the first multi-mode feature vector, the first global feature vector, and the first label vector set to a computing model, to obtain the target image description information, where the computing model is a model obtained through training according to image description information and the reference image description information of the training image.

In some embodiments of this application, the computing model includes n depth networks, and n is a positive integer.

The generation module 520 is further configured to generate the target image description information according to the first multi-mode feature vector, the first global feature vector, the first label vector set, and the n depth network.

An input parameter of at least one depth network in the n depth networks includes a spliced vector, when an input parameter of the ith depth network includes the spliced vector, if i=1, the spliced vector is a vector obtained by splicing the multi-mode feature vector and the label vector set, if i>1, the spliced vector is a vector obtained by splicing an output vector of the (i−1)th depth network and the multi-mode feature vector, 1≤i≤n.

Figure 5B:
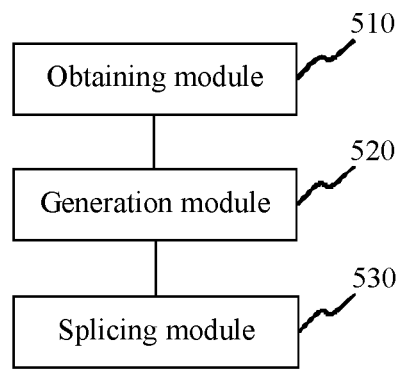
FIG. 5B is a schematic structural diagram of an image description generation apparatus according to an embodiment of this application.

In some embodiments of this application, n=2, and the apparatus further includes a splicing module 530, as shown in FIG. 5B.

The splicing module 530 is configured to splice the first multi-mode feature vector and the first label vector set, to obtain a first spliced vector.

The generation module 520 is further configured to input the first spliced vector and the first global feature vector to a first depth network, to obtain a first output vector.

The splicing module 530 is configured to splice the first output vector and the first multi-mode feature vector, to obtain a second spliced vector.

The generation module 520 is further configured to input the second spliced vector to a second depth network, to obtain the target image description information.

Figure 5C:
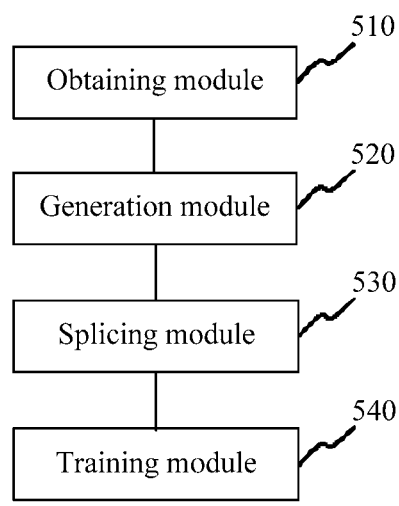
FIG. 5C is a schematic structural diagram of an image description generation apparatus according to an embodiment of this application.

In some embodiments of this application, the apparatus further includes a training module 540, as shown in FIG. 5C.

The obtaining module 510 is further configured to obtain a second global feature vector and a second label vector set of the training image, and a text feature vector of the reference image description information of the training image.

The training module 540 is configured to train the matching model according to the second global feature vector and the text feature vector.

In some embodiments of this application,

The generation module 520 is configured to generate a second multi-mode feature vector of the training image through the matching model obtained through training.

The generation module 520 is further configured to input the second multi-mode feature vector, the second global feature vector, and the second label vector set to the computing model, to obtain the image description information of the training image.

The training module 540 is further configured to train the computing model according to the image description information and the reference image description information when the reference image description information does not match the generated image description information.

It should be noted that, when the image description generation apparatus provided in the foregoing embodiment is only described by division of the foregoing functional modules. In a practical application, the functions may be allocated to be completed by different functional modules according to requirements. That is, an internal structure of a computing device such as a server or terminal is divided into different functional modules, to complete all or some of the functions described above. In addition, the image description generation apparatus and the image description generation method provided in the foregoing embodiments belong to the same concept. For a specific implementation process, refer to the method embodiment, and details are not described herein again.

Figure 6A:
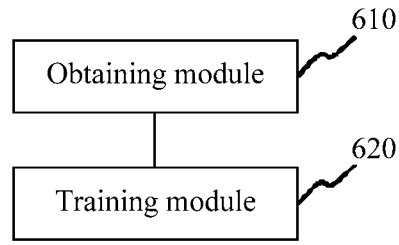
FIG. 6A is a schematic structural diagram of a model training apparatus according to an embodiment of this application.

FIG. 6A is a schematic structural diagram of a model training apparatus according to an embodiment of this application. As shown in FIG. 6A, the model training apparatus is configured to train the matching model and the computing model in the foregoing embodiment. The apparatus may include an obtaining module 610 and a training module 620.

The obtaining module 610 is configured to obtain a global feature vector and a label vector set of a training image, and a text feature vector of reference image description information of the training image.

The training module 620 is configured to train the matching model according to the global feature vector and the text feature vector.

In view of the above, for the model training apparatus in this embodiment, the matching model is trained according to the training image and the reference image description information corresponding to the training image, so that the multi-mode feature vector generated by the trained matching model includes predicted text information; the multi-mode feature vector including the predicted text information is input to the computing model, so that the description information of the training image generated by the computing model is more accurate; and finally, the computing model is trained according to the relatively accurate description information and reference image description information of the training image, to achieve effects of enhancing accuracy of the image description information generated by a description generation model.

Figure 6B:
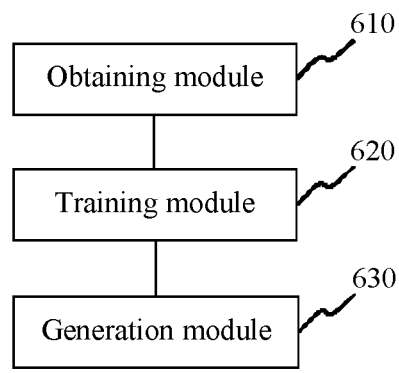
FIG. 6B is a schematic structural diagram of a model training apparatus according to an embodiment of this application.

Based on the model training apparatus according to the foregoing embodiment, in some embodiments of this application, the apparatus further includes: a generation module 630, as shown in FIG. 6B.

The generation module 630 is configured to generate a multi-mode feature vector of the training image through the matching model obtained through training.

The generation module 630 is further configured to input the multi-mode feature vector, the global feature vector, and the label vector set to the computing model, to obtain the image description information of the training image.

The training module 620 is further configured to train the computing model according to the image description information and the reference image description information when the reference image description information does not match the generated image description information.

In some embodiments of this application, the computing model includes n depth networks, and n is a positive integer.

The generation module 630 is further configured to generate the image description information according to the multi-mode feature vector, the global feature vector, the first label vector set, and the n depth network.

An input parameter of at least one depth network in the n depth networks includes a spliced vector, when an input parameter of the ith depth network includes the spliced vector, if i=1, the spliced vector is a vector obtained by splicing the multi-mode feature vector and the label vector set, if i>1, the spliced vector is a vector obtained by splicing an output vector of the (i−1)th depth network and the multi-mode feature vector, $1 \leq i \leq n$.

Figure 6C:
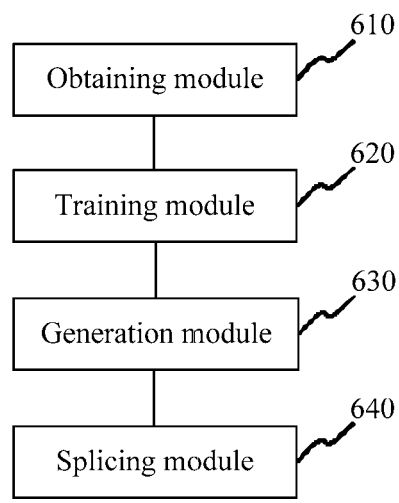
FIG. 6C is a schematic structural diagram of a model training apparatus according to an embodiment of this application.

In some embodiments of this application, n=2, and the apparatus further includes a splicing module 640, as shown in FIG. 6C.

The splicing module 640 is configured to splice the multi-mode feature vector and the label vector set, to obtain a first spliced vector.

The generation module 630 is further configured to input the first spliced vector and the global feature vector to a first depth network, to obtain a first output vector.

The splicing module 640 is configured to splice the first output vector and the multi-mode feature vector, to obtain a second spliced vector.

The generation module 630 is further configured to input the second spliced vector to a second depth network, to obtain the image description information.

It should be noted that, when the model training apparatus provided in the foregoing embodiment is only described by division of the foregoing functional modules. In a practical application, the functions may be allocated to be completed by different functional modules according to requirements. That is, an internal structure of a computing device such as a server or terminal is divided into different functional modules, to complete all or some of the functions described above. In addition, the model training apparatus and the model training method provided in the foregoing embodiments belong to the same concept. For a specific implementation process, refer to the method embodiment, and details are not described herein again.

An embodiment of this application further provides a computer-readable storage medium. The computer-readable storage medium may be a computer-readable storage medium included in a memory, or may be a computer-readable storage medium that exists alone and is not assembled into a terminal or a server. The computer-readable storage medium stores at least one instruction, at least one program, a code set or an instruction set. Furthermore, when the computer-readable storage medium is stored in a generation device, the at least one instruction, the at least one program, code set or instruction set is loaded and executed by the processor to implement the image description generation method in the foregoing embodiment.

When the computer-readable storage medium is used in a server, the at least one instruction, the at least one program, the code set, or the instruction set is loaded by the processor and executed to implement the object interception method at the server side.

Figure 7:
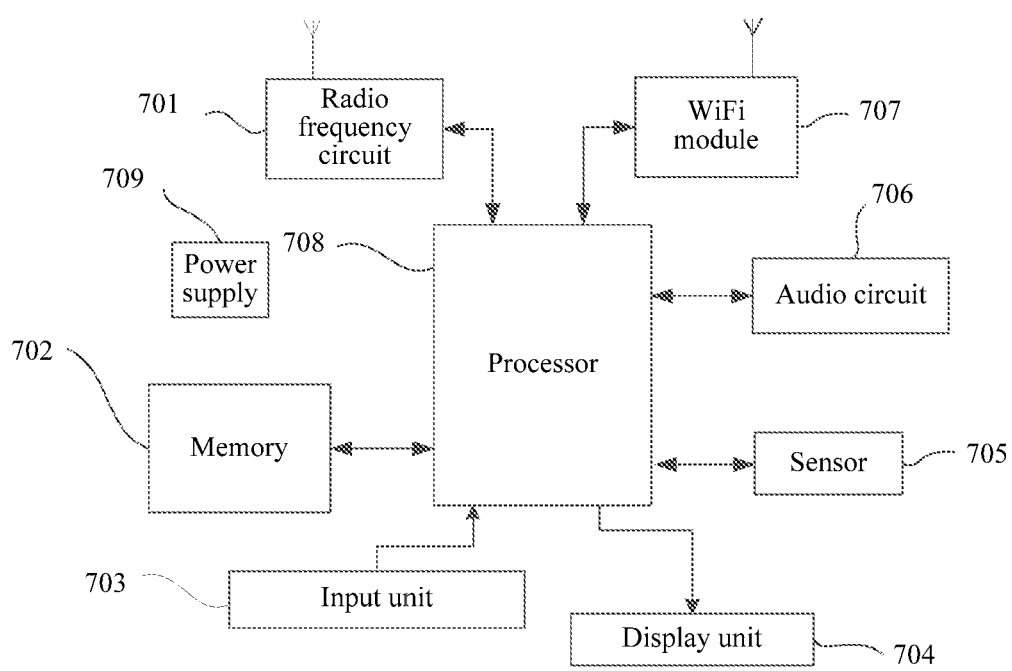
FIG. 7 is a schematic structural diagram of a terminal according to an embodiment of this application.

FIG. 7 is a block diagram of a terminal 700 according to an embodiment of this application. The terminal may include a Radio Frequency (RF) circuit 701, a memory 702 including one or more computer-readable storage mediums, an input unit 703, a display unit 704, a sensor 705, au audio circuit 706, a Wireless Fidelity (WiFi) module 707, a processor 708 including one or more processing cores, and a power supply 709. A person skilled in the art may understand that the structure of the terminal shown in FIG. 7 does not constitute a limitation to the terminal, and the terminal may include more components or fewer components than those shown in the figure, or some components may be combined, or a different component deployment may be used. Where:

The RF circuit 701 may be configured to receive and send signals during an information receiving and sending process or a call process. Particularly, the RF circuit receives downlink information from a base station, then delivers the downlink information to one or more processors 708 for processing, and sends related uplink data to the base station. Generally, the RF circuit 701 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 701 may also communicate with a network and another device through wireless communication. The wireless communication may use any communication standard or protocol, including but not limited to Global System of Mobile Communication (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 702 may be configured to store a software program and module. The processor 708 runs the software program and module stored in the memory 702, to implement various functional applications and data processing. The memory 702 may mainly include a program storage area and a data storage area. The program storage area may store an operating system, an application program required by at least one function (such as a sound playback function and an image display function), and the like. The data storage area may store data (such as audio data and an address book) created according to the use of the terminal, and the like. In addition, the memory 702 may include a high-speed random access memory, and may further include a non-volatile memory such as at least one magnetic disk storage device, a flash memory device, or another volatile solid storage device. Correspondingly, the memory 702 may further include a memory controller, to provide access of the processor 708 and the input unit 703 to the memory 702.

The input unit 703 may be configured to receive input digit or character information, and generate a keyboard, mouse, joystick, optical, or track ball signal input related to the user setting and function control. Specifically, in a specific embodiment, the input unit 703 may include a touch sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory, such as a finger or a stylus), and drive a corresponding connection apparatus according to a preset program. In some embodiments of this application, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 708. In addition, the touch controller can receive a command sent by the processor 708 and execute the command. In addition, the touch-sensitive surface may be implemented by a resistive, capacitive, infrared, or surface sound wave type touch-sensitive surface. In addition to the touch-sensitive surface, the input unit 703 may further include another input device. Specifically, the another input device may include, but is not limited to, one or more of a physical keyboard, a functional key (such as a volume control key or a switch key), a track ball, a mouse, and a joystick.

The display unit 704 may be configured to display information input by the user or information provided for the user, and various graphical user interfaces of the terminal. These graphical user interfaces may include a graph, text, an icon, a video and any combination thereof. The display unit 704 may include a display panel, and in some embodiments of this application, the display panel may be configured by using a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 708, so as to determine a type of the touch event. Then, the processor 708 provides a corresponding visual output on the display panel according to the type of the touch event. Although, in FIG. 7, the touch-sensitive surface and the display panel are used as two separate parts to implement input and output functions, but in some embodiments, the touch-sensitive surface and the display panel may be integrated to implement the input and output functions.

The terminal may further include at least one sensor 705 such as an optical sensor, a motion sensor, and other sensors. Specifically, the optical sensor may include an ambient light sensor and a proximity sensor. The ambient light sensor may adjust luminance of the display panel according to brightness of the ambient light. The proximity sensor may switch off the display panel and/or backlight when the terminal is moved to the ear. As one type of the motion sensor, a gravity acceleration sensor may detect a value of acceleration at each direction (which generally is triaxial), may detect a value and a direction of the gravity when being static, and may be configured to identify an application of a mobile phone gesture (such as a handover between horizontal and longitudinal screens, a related game, and gesture calibration of a magnetometer), a related function of vibration identification (such as a pedometer and a knock), and the like. Another sensor, such as a gyroscope, a barometer, a hygrometer, a thermometer, and an infrared sensor, which can be configured in the terminal, is not described herein again.

The audio circuit 706, the speaker, and the microphone may provide audio interfaces between the user and the terminal. The audio circuit 706 may convert received audio data into an electrical signal and transmit the electrical signal to the speaker. The speaker converts the electrical signal into a sound signal for output. On the other hand, the microphone converts a collected sound signal into an electrical signal. The audio circuit 706 receives the electrical signal, converts the electrical signal into audio data, and outputs the audio data to the processor 708 for processing. Then, the processor sends the audio data to, for example, another terminal by using the RF circuit 701, or outputs the audio data to the memory 702 for further processing. The audio circuit 706 may further include an earplug jack, to provide communication between a peripheral earphone and the terminal.

Wi-Fi belongs to a short distance wireless transmission technology. The terminal may help, by using the Wi-Fi module 707, a user to receive and send an email, browse a web page, access stream media, and the like. This provides wireless broadband Internet access for the user. Although FIG. 7 shows the Wi-Fi module 707, it may be understood that the Wi-Fi module 707 is not a necessary component of the terminal, and the Wi-Fi module may be omitted as required provided that the scope of the essence of this application is not changed.

The processor 708 is the control center of the terminal, and is connected to various parts of the mobile phone by using various interfaces and lines. By running or executing the software program and/or module stored in the memory 702, and invoking data stored in the memory 702, the processor performs various functions and data processing of the terminal, thereby performing overall monitoring on the mobile phone. In some embodiments of this application, the processor 708 may include one or more processing cores. In some embodiments of this application, the processor 708 may integrate an application processor and a modem processor. The application processor mainly processes an operating system, a user interface, an application program, and the like. The modem processor mainly processes wireless communication. It may be understood that the foregoing modem processor may alternatively not be integrated into the processor 708.

The terminal further includes the power supply 709 (such as a battery) for supplying power to the components. Preferably, the power supply may be logically connected to the processor 708 by using a power management system, thereby implementing functions such as charging, discharging, and power consumption management by using the power management system. The power supply 709 may further include one or more direct current power supplies or alternating current power supplies, a re-charging system, a power failure detection circuit, a power supply converter or inverter, a power supply state indicator, and any other component.

Although not shown in the figure, the terminal may further include a camera, a Bluetooth module, and the like, which are not further described herein. Specifically, in this embodiment, the processor 708 in the terminal runs at least one instruction stored in the memory 702, to implement the image description generation method and/or model training method in each method embodiment.

Figure 8:
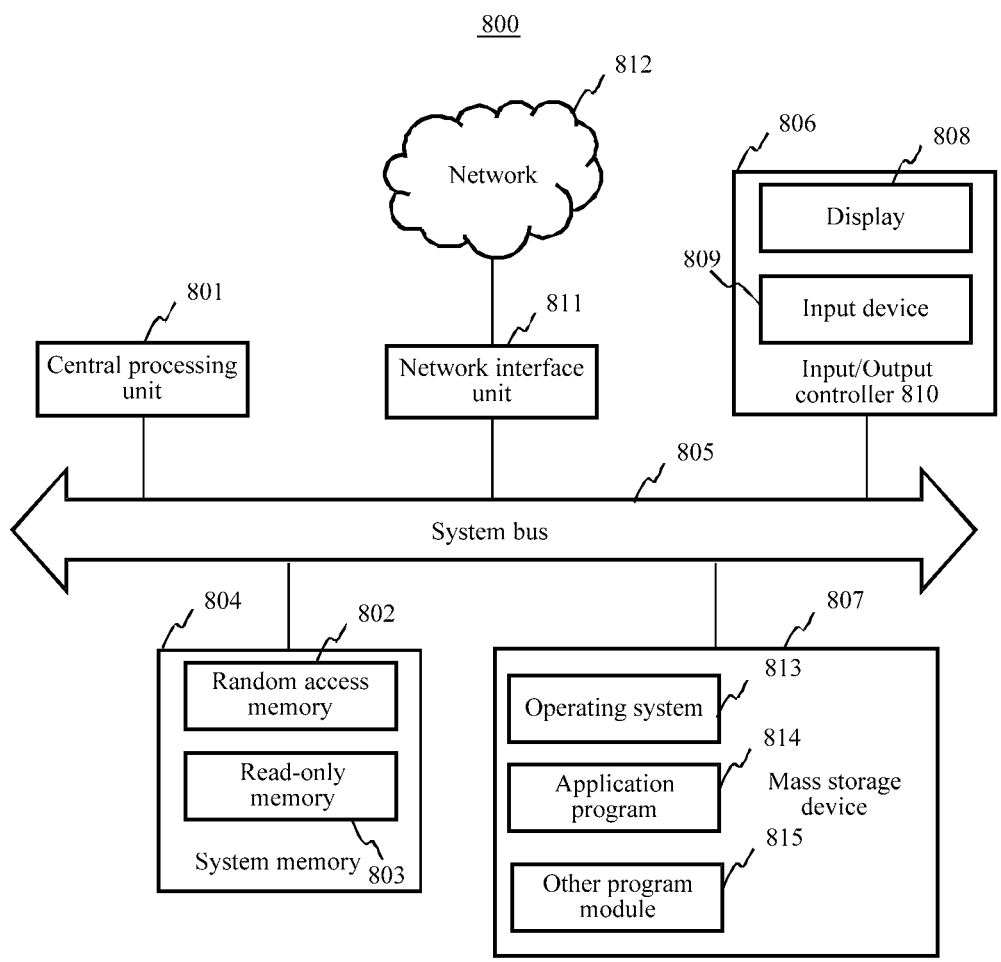
FIG. 8 is a schematic structural diagram of a server according to an embodiment of this application.

FIG. 8 is a schematic structural diagram of a server according to an embodiment of this application. The server is configured to implement the image description generation method and/or model training method in each method embodiment. Specifically:

A server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output system (I/O system) 806 for transmitting information between components in a computer, and a mass storage device 807 used for storing an operating system 813, an application program 814, and another program module 815.

The basic I/O system 806 includes a display 808 configured to display information, and an input device 809 used by a user to input information, such as a mouse or a keyboard. The display 808 and the input device 809 are connected to an input/output controller 810 of the system bus 805, to be connected to the CPU 801. The basic I/O system 806 may further include the input/output controller 810, to receive and process inputs from multiple other devices, such as the keyboard, the mouse, or an electronic stylus. Similarly, the input and output controller 810 further provides an output to a display screen, a printer or another type of output device.

The mass storage device 807 is connected to the CPU 801 by using a mass storage controller (not shown) connected to the system bus 805. The mass storage device 807 and an associated computer-readable medium provide non-volatile storage for the server 800. That is, the mass storage device 807 may include a computer-readable medium (not shown), such as a hard disk or a CD-ROM drive.

Without loss of generality, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an EPROM, an EEPROM, a flash memory, or other solid storage technologies; a CD-ROM, a DVD, or other optical storages; and a cassette, a magnetic tape, a disk storage, or other magnetic storage devices. Certainly, a person skilled in the art may know that the computer storage medium is not limited to the foregoing types. The system memory 804 and the mass storage device 807 may be collectively referred to as a memory.

According to the embodiments of this application, the server 800 may further be connected, through a network such as the Internet, to a remote computer on the network. That is, the server 800 may be connected to a network 812 by using a network interface unit 811 connected to the system bus 805, or may be connected to another type of network or a remote computer system (not shown) by using a network interface unit 811.

The memory further includes at least one instruction that is configured to be executed by one or more processors. The at least one instruction includes instructions for executing the image description generation method and/or the model training method provided by each embodiment.

It should be understood that, a singular form "one" ("an", "an", and "the") used herein also includes a plural form, unless an exception is supported clearly in the context. It should further be understood that, the word "and/or" used herein includes any or all possible combinations of one or more associated items that are listed.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a ROM, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A computer-implemented method for generating an image description, the method comprising:
   obtaining a target image;
   generating a first and a second global feature vectors and a first and a second label vector sets of the target image using a feature extraction model;
   generating a first and a second multi-mode feature vectors of the target image through a matching model, wherein the matching model is a model obtained through training according to a training image and reference image description information of the training image; and
   applying the first and the second multi-mode feature vectors, the first and the second global feature vectors, and the first and the second label vector sets to a computing model, to obtain target image description information, wherein the computing model is a model obtained through training according to image description information of the training image and the reference image description information, further including:
      splicing the first and second multi-mode feature vectors output by the matching model and the first and second label vector sets output by the feature extraction model, to obtain a first spliced vector and a second spliced vector; and
      inputting the first and second spliced vectors and the first and second global feature vectors to the computing model, to obtain the target image description information.

2. The method according to claim 1, wherein the first multi-mode feature vector includes predicted text information of the target image.

3. The method according to claim 1, wherein the computing model comprises a first depth network and a second depth network;
   the inputting the first and second spliced vectors and the first and second global feature vectors to the computing model, to obtain the target image description information comprises:
      applying the first spliced vector and the first and second global feature vectors to the first depth network, to obtain a first output vector;
      splicing the first output vector and the first and second multi-mode feature vectors, to obtain the second spliced vector; and
      applying the second spliced vector to the second depth network, to obtain the target image description information.

4. The method according to claim 1, further comprising:
   obtaining a text feature vector of the reference image description information of the training image; and
   training the matching model according to the second global feature vector and the text feature vector.

5. The method according to claim 4, further comprising:
   training, if the reference image description information does not match the image description information of the training image, the computing model according to the image description information and the reference image description information of the training image.

6. A computing device, comprising one or more processors, memory coupled to the one or more processors and a plurality of programs stored in the memory that, when executed by the one or more processors, cause the computing device to perform a plurality of operations comprising:
   obtaining a target image;
   generating a first and a second global feature vectors and a first and a second label vector sets of the target image;
   generating a first and a second multi-mode feature vectors of the target image through a matching model, wherein the matching model is a model obtained through training according to a training image and reference image description information of the training image; and
   applying the first and the second multi-mode feature vectors, the first and the second global feature vectors, and the first and the second label vector sets to a computing model, to obtain target image description information, wherein the computing model is a model obtained through training according to image description information of the training image and the reference image description information, further including:
      splicing the first and second multi-mode feature vectors output by the matching model and the first and second label vector sets output by the feature extraction model, to obtain a first spliced vector and a second spliced vector; and
      inputting the first and second spliced vectors and the first and second global feature vectors to the computing model, to obtain the target image description information.

7. The computing device according to claim 6, wherein the first multi-mode feature vector includes predicted text information of the target image.

8. The computing device according to claim 6, wherein the computing model comprises a first depth network and a second depth network;
   the inputting the first and second spliced vectors and the first and second global feature vectors to the computing model, to obtain the target image description information comprises:
      applying the first spliced vector and the first and second global feature vectors to the first depth network, to obtain a first output vector;
      splicing the first output vector and the first and second multi-mode feature vectors, to obtain the second spliced vector; and
      applying the second spliced vector to the second depth network, to obtain the target image description information.

9. The computing device according to claim 6, wherein the plurality of operations further comprise:
   obtaining a text feature vector of the reference image description information of the training image; and
   training the matching model according to the second global feature vector and the text feature vector.

10. The computing device according to claim 9, wherein the plurality of operations further comprise:
    training, if the reference image description information does not match the image description information of the training image, the computing model according to the image description information and the reference image description information of the training image.

11. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
    obtaining a target image;
    generating a first and a second global feature vectors and a first and a second label vector sets of the target image;

generating a first and a second multi-mode feature vectors of the target image through a matching model, wherein the matching model is a model obtained through training according to a training image and reference image description information of the training image; and applying the first and the second multi-mode feature vectors, the first and the second global feature vectors, and the first and the second label vector sets to a computing model, to obtain target image description information, wherein the computing model is a model obtained through training according to image description information of the training image and the reference image description information, further including:

splicing the first and second multi-mode feature vectors output by the matching model and the first and second label vector sets output by the feature extraction model, to obtain a first spliced vector and a second spliced vector; and inputting the first and second spliced vectors and the first and second global feature vectors to the computing model, to obtain the target image description information.

12. The non-transitory computer readable storage medium according to claim 11, wherein the first multi-mode feature vector includes predicted text information of the target image.

13. The non-transitory computer readable storage medium according to claim 11, wherein the computing model comprises a first depth network and a second depth network;

the inputting the first and second spliced vectors and the first and second global feature vectors to the computing model, to obtain the target image description information comprises:

applying the first spliced vector and the first and second global feature vectors to the first depth network, to obtain a first output vector;

splicing the first output vector and the first and second multi-mode feature vectors, to obtain the second spliced vector; and applying the second spliced vector to the second depth network, to obtain the target image description information.

14. The non-transitory computer readable storage medium according to claim 11, wherein the plurality of operations further comprise:

obtaining a text feature vector of the reference image description information of the training image; and training the matching model according to the second global feature vector and the text feature vector.

15. The non-transitory computer readable storage medium according to claim 14, wherein the plurality of operations further comprise:

training, if the reference image description information does not match the image description information of the training image, the computing model according to the image description information and the reference image description information of the training image.

16. The non-transitory computer readable storage medium according to claim 11, wherein the first multi-mode feature vector includes predicted text information of the target image.

17. The non-transitory computer readable storage medium according to claim 11, wherein the computing model comprises a first depth network and a second depth network;

the inputting the first and second spliced vectors and the first and second global feature vectors to the computing model, to obtain the target image description information comprises:

applying the first spliced vector and the first and second global feature vectors to the first depth network, to obtain a first output vector;

splicing the first output vector and the first and second multi-mode feature vectors, to obtain the second spliced vector; and applying the second spliced vector to the second depth network, to obtain the target image description information.

\* \* \* \* \*